Sept. 19, 1933.    H. A. WILLIAMS    1,927,054
MIXING VALVE
Filed May 13, 1932
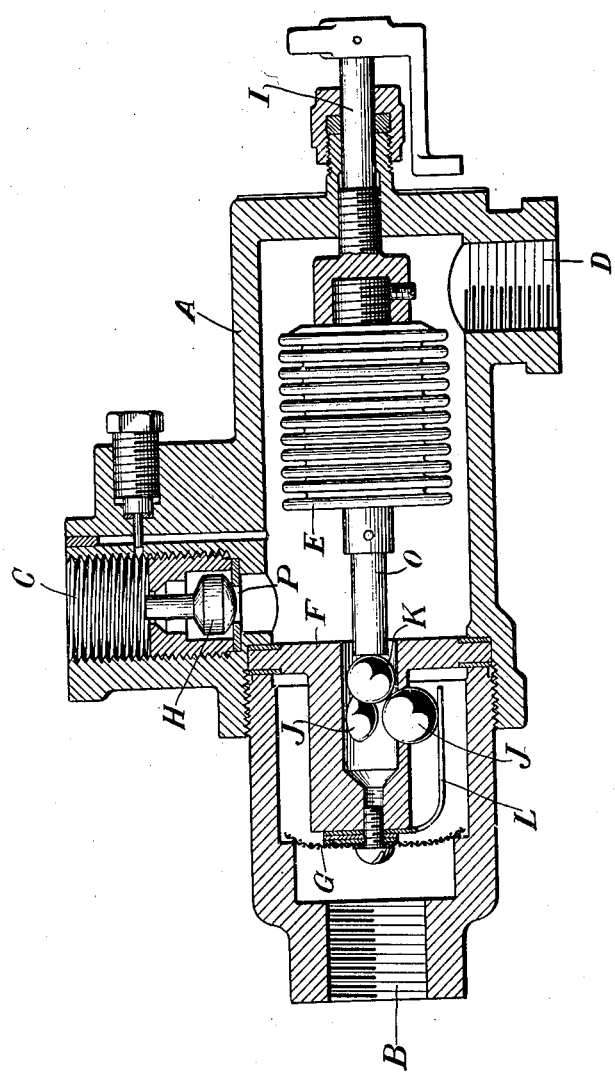
INVENTOR
*Harry A. Williams*
BY
*E. M. Bentley*
ATTORNEY Patented Sept. 19, 1933

1,927,054

UNITED STATES PATENT OFFICE 1,927,054

MIXING VALVE

Harry A. Williams, Albany, N. Y., assignor to Hynes & Cox Electric Corporation, Albany, N. Y., a corporation of New York Application May 13, 1932. Serial No. 611,162

9 Claims. (Cl. 236—12)

For a detailed description of the present form of my invention, reference may be had to the following specification and to the accompanying drawing, which shows a longitudinal section of the valve, forming a part thereof.

My present valve consists in an improvement on the one shown in my application Serial No. 496,515, filed November 18, 1930.

The valve of the aforesaid application Serial No. 496,515, has the practical disadvantage that it is necessary to machine the piston and cylinder with extreme accuracy in order to prevent leakage of cold water when the valve is closed. Even when so machined, it is impossible to so fit the piston in the cylinder as to prevent entirely the leakage of cold water when the valve is closed. The necessary clearance is such that, under normal conditions, the leakage will reduce the temperature of the hot water approximately ten degrees at times when the hot water supply is at or below the temperature for which the valve is set to deliver mixed water. In addition fine grit is carried in through the cold water supply and deposited on the moving parts, causing the piston to stick in the cylinder.

It is the purpose of this valve in the present application to mix hot and cold liquids with great accuracy and speed to any desired degree independently of hydrostatic pressure. To that end I employ a controlling thermostat formed as an expansible vessel which, in its contracted form, is completely filled with a liquid that is non-vaporizable at the highest temperature to which it may be subjected when in action. Thereby the expansion of said vessel responds to temperature alone and is independent of any elasticity in the said vessel which might respond to hydrostatic pressure. The said vessel is arranged to act on the cold water inflow only, which inflow is injected with a current of checked but non-regulated hot water. Thereby the opening action of the controller is started instantly by the hottest water and is correspondingly rapid. It also admits instantly the largest supply of modifying cold water. The cold inflow valve, on which said controlling vessel alone acts, is located back of and in line with the outflow stream, which makes the device extremely simple and cheap to manufacture.

While retaining the characteristics mentioned above, I have reorganized the cold water valve itself to avoid the exact fitting required by its previous cylinder-and-piston form.

Referring to the drawing A represents the hollow body of the valve. B is the cold water inlet. C the hot water inlet and D the outflow orifice for the mixture. E is the said controlling vessel which is mounted on the shaft I that is adjustably seated in one end of the device.

The cold water enters by the partition or valve structure F which here consists of a three sided hollow metal block secured by a flange projecting between the two halves of the valve casing. In each of the three sides of F is a valve hole in which is seated a ball J. (Only two such holes appear in the figure.) Each ball is seated in each hole, being slightly larger than the hole, and held therein by an external spring L which is clear of all obstruction. On each of the three balls J, and on the inside thereof, impinges a smaller operating ball, or similar loose object, K, that is pushed against all three valves by the rod O projecting from the controlling vessel E. By this movement of K, each of the three balls J is pushed slightly out of its hole in the wall of F in which it is seated and against its spring L. An inflow of water through the hole follows. The operating ball K is smaller in diameter by one sixteenth of an inch than the passage containing it which allows the water to pass around it. This provides an extremely cheap and an extremely effective and controllable valve. It eliminates the careful and laborious turning down and fitting of the previous form aforesaid. Each ball J fits its hole tightly and is held in place thereon by its outside free spring L, while the operating ball K acts equally on the three balls J and is held in place by the pressure thereon of rod O.

For the hot water I provide an oval valve H which seats against, but without closing, a perforation in plate P and is guided in a straight line by a plug in its rear. Back of the ball holder F is a screen G extending across the cold-water valve-holder F.

What I claim as new and desire to secure by Letters Patent is:

1. A liquid mixing valve comprising a casing having a cold fluid inlet branch, a hot fluid inlet branch and an outlet branch, a mixing chamber between the inlet branches and the outlet branch, a valve carrier in said cold fluid inlet branch, said carrier having a plurality of radially disposed passages connecting said cold fluid inlet branch to the mixing chamber, a plurality of ball valves one for each of said openings, means for normally holding said valves to positions closing said passages, and means for imparting simultaneous and uniform opening movements to said valves in radial directions.

2. A liquid mixing chamber comprising a casing having inlet branches and an outlet branch, a mixing chamber between the inlet branches and the outlet branch, a valve carrier projected longitudinally into one of said inlet branches, a plurality of equi-distantly disposed radial passages in said carrier connecting the last mentioned inlet branch with the mixing chamber, spring pressed valves normally closing said passages, and means movable axially of the carrier and constructed and arranged to move said valves radially outward so as to simultaneously open all of said passages.

3. A liquid mixing valve comprising a casing having a plurality of inlet branches, an outlet branch and a mixing chamber between the inlet branches and the outlet branch, a valve carrier located in one of said branches, said carrier having a plurality of radially disposed passages connecting the last mentioned inlet branch with the mixing chamber, valves normally biased to close said openings, and an axially movable thermally controlled member positioned to simultaneously engage said valves and move them to open positions in opposition to said biasing means.

4. A liquid mixing valve comprising a casing having a plurality of inlet branches, an outlet branch and a mixing chamber between the inlet branches and the outlet branch, a valve carrier projected longitudinally into one of said inlet branches and provided with a plurality of equi-distant radially disposed passages establishing communication between said inlet branch and said mixing chamber, valves for the respective passages, springs normally acting to seat said valves so as to close said passages, a thermostatic member in said mixing chamber, said member being immune to hydrostatic pressure and having means for simultaneously moving all of said valves to unseated position against the tension of said springs.

5. A liquid mixing valve comprising a casing having a plurality of inlet branches, an outlet branch and a mixing chamber between the inlet branches and the outlet branch, a valve carrier in one of said inlet branches, said carrier having a plurality of equi-distant radially disposed passages, establishing communication between the last mentioned inlet branch and the mixing chamber, ball valves controlling said passages, yieldable external means normally acting to move said valves radially inward so as to seat them, and thermostat means located in the mixing chamber, said thermostatic means being immune to hydrostatic pressure and having a member axially movable between the valves so as to unseat them.

6. A liquid mixing valve comprising a casing having a plurality of inlet branches, an outlet branch and a mixing chamber interposed between said inlet branches and the outlet branch, a valve carrier removably mounted in one of said inlet branches and having an axial passage therein provided with radially disposed openings so as to provide communication between the last mentioned inlet branch and the mixing chamber, radially movable valves in said openings, springs normally pressing said valves inwardly so as to seat them, a thermostatic member located in the mixing chamber, said thermostat being immune to hydrostatic pressure, and means located in said passageway and operated by said thermostat for simultaneously unseating said valves against the tension of their springs.

7. A liquid mixing valve comprising a casing having a plurality of inlet branches, an outlet branch and a mixing chamber between said branches, a valve carrier removably mounted in one of said inlet branches and having a portion extended axially into said branch, said axially extended portion having an axial passage therein and a plurality of radially disposed openings extended through the wall of said passage so as to provide communication between the last mentioned inlet branch and the mixing chamber, spring pressed valves normally closing said radially disposed openings, a thermostat member located in the mixing chamber and immune to hydrostatic pressure, said thermostat member having a stem mounted to reciprocate within said passageway, and means operated by said stem mounted to reciprocate within said passageway, and means operated by said stem for unseating said valves against the tension of their springs.

8. A liquid mixing valve containing an expansive vessel filled with a liquid nonvaporizable at the highest temperature, whereby the said vessel responds to temperature alone independent of its elasticity, said vessel being constructed and arranged to act on the cold water inflow only and inject cold water into a current of checked but non-regulated hot water.

9. A liquid mixing valve containing an expansive vessel filled with a liquid nonvaporizable at the highest temperature, whereby the said vessel responds to temperature alone independent of its elasticity, said vessel being constructed and arranged to act on the cold water inflow only and inject cold water into a current of checked but non-regulated hot water, said cold inflow being located back of and in line with the outflow stream.

HARRY A. WILLIAMS.